(12) United States Patent
Hu

(10) Patent No.: US 8,484,029 B2
(45) Date of Patent: Jul. 9, 2013

(54) DEVICE AND METHOD FOR BOOTING HANDHELD APPARATUS BY SOUND DETECTION

(75) Inventor: Shang-Fei Hu, Shanghai (CN)

(73) Assignees: Inventec Appliances (Shanghai) Co. Ltd., Shanghai (CN); Inventec Appliances Corp., Taipei County (TW)

( * ) Notice: Subject to any disclaimer, the term of this patent is extended or adjusted under 35 U.S.C. 154(b) by 422 days.

(21) Appl. No.: 12/894,910

(22) Filed: Sep. 30, 2010

(65) Prior Publication Data

US 2011/0153332 A1    Jun. 23, 2011

(30) Foreign Application Priority Data

Dec. 17, 2009    (CN) .......................... 2009 1 0262340

(51) Int. Cl.
*G10L 11/00* (2006.01)
*G06F 1/26* (2006.01)
*H01H 35/00* (2006.01)

(52) U.S. Cl.
USPC ........ 704/270; 704/272; 200/61.01; 381/110; 713/310

(58) Field of Classification Search
USPC ........ 704/270, 272, 275; 181/138; 200/61.01; 381/110; 713/310
See application file for complete search history.

(56) References Cited

U.S. PATENT DOCUMENTS

| | | | | |
|---|---|---|---|---|
| 3,247,339 A | * | 4/1966 | Miller | 200/61.01 |
| 3,379,165 A | * | 4/1968 | Mott | 137/803 |
| 3,892,920 A | * | 7/1975 | Kolm | 367/197 |
| 4,207,696 A | * | 6/1980 | Hyman et al. | 40/473 |
| 4,520,576 A | * | 6/1985 | Vander Molen | 34/534 |
| 4,640,034 A | * | 2/1987 | Zisholtz | 40/455 |
| 5,107,555 A | * | 4/1992 | Thrasher | 5/109 |
| 5,615,271 A | * | 3/1997 | Stevens et al. | 381/110 |
| 8,059,835 B2 | * | 11/2011 | Hauck | 381/110 |
| 8,130,595 B2 | * | 3/2012 | Ohguri et al. | 367/198 |
| 2009/0002191 A1 | * | 1/2009 | Kitaura | 340/825.62 |
| 2011/0078931 A1 | * | 4/2011 | Sapp et al. | 40/124.03 |
| 2012/0304510 A1 | * | 12/2012 | Qiao et al. | 40/124.03 |

\* cited by examiner

*Primary Examiner* — Martin Lerner
(74) *Attorney, Agent, or Firm* — WPAT, P.C.; Anthony King

(57) ABSTRACT

A device for booting a handheld apparatus by sound detection includes a base, a power-on device, a trigger switch, and an acoustic sensor. Upon the handheld apparatus being placed at the base to trigger the trigger switch, the trigger switch controls the power-on device to power on the handheld apparatus. After the handheld apparatus is powered on, the acoustic sensor detects a sound of the handheld apparatus and then controls a pressure head of the power-on device to move away. The device and its method for booting a handheld apparatus by sound detection come with the advantages of a simple and easy operation and a high efficiency.

15 Claims, 6 Drawing Sheets

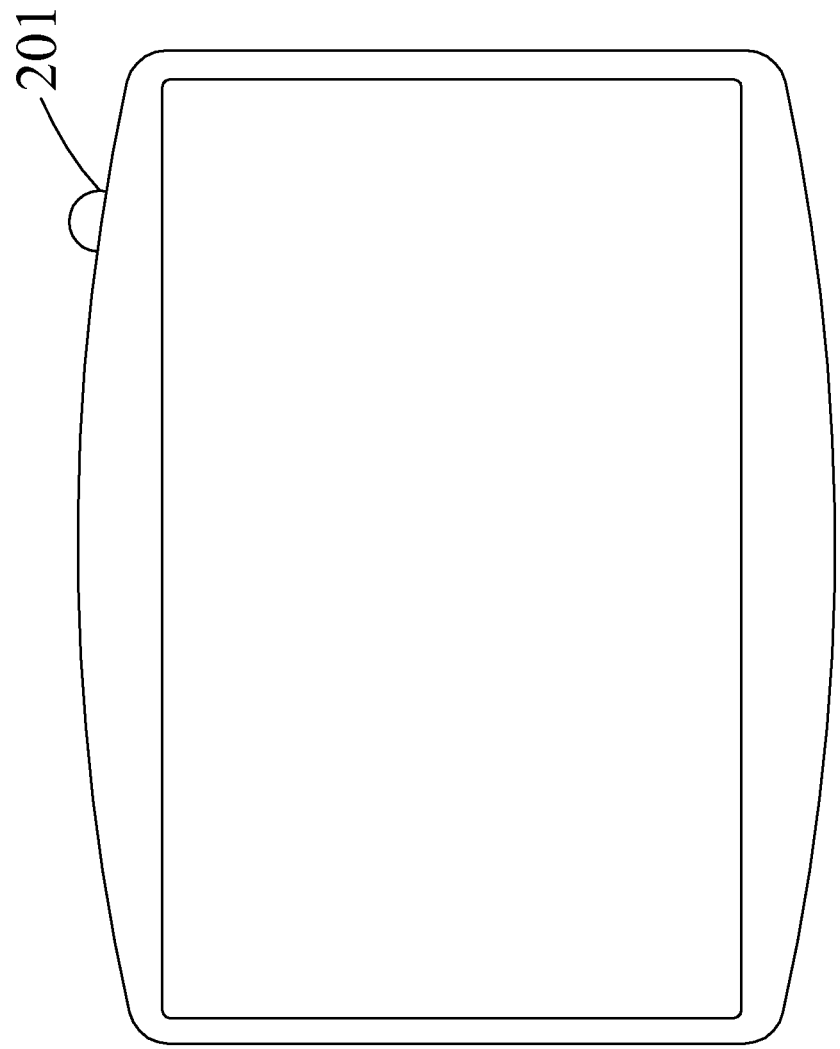

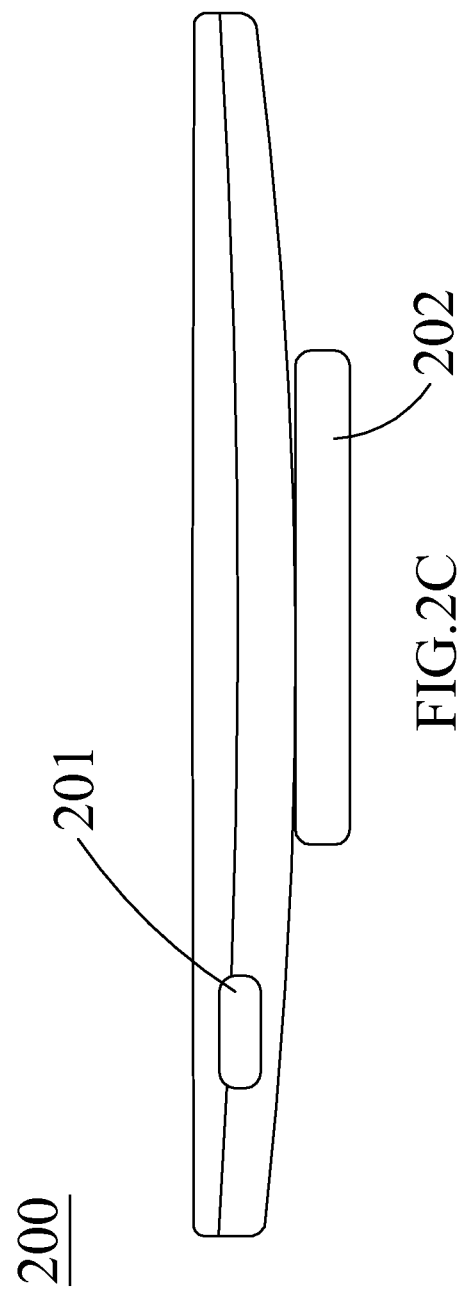

DEVICE AND METHOD FOR BOOTING HANDHELD APPARATUS BY SOUND DETECTION

BACKGROUND OF THE INVENTION

1. Field of the Invention

The present invention relates to a technology for booting a handheld apparatus, and more particularly to a device and a method for booting a handheld apparatus by voice control.

2. Description of the Related Art

At present, most machines used in a production line involved an operation of powering on various different components of the machines, and the power-on operation is usually taken place manually, since the manual control requires less technical skill. Although the manual power-on operation can save costs for a short term, yet there are drawbacks in mass production for a long term. The power-on operation of some handheld apparatuses requires a long-time pressing procedure before the apparatuses enter into a working program. If the power-on operation is performed manually, a user's fingers may get fatigue easily, and the working efficiency may become lower substantially. Therefore, it is an important subject for manufactures to develop an automated machine to enter into a desired working program.

SUMMARY OF THE INVENTION

It is a primary objective of the invention to overcome the aforementioned shortcoming of the conventional handheld apparatus that requires a longer time of pressing in order to power on the handheld apparatus by providing a device for booting a handheld apparatus by voice control in accordance with the present invention.

To achieve the foregoing objectives, the present invention provides a device for booting a handheld apparatus by voice control, which comprises: a base having an opening formed on a surface of the base; a trigger switch protruded from the surface of the base; an acoustic sensor disposed within the opening; and a power-on device including a pushing device and a pressure head. When the handheld apparatus is placed at the base and the trigger switch is triggered, the trigger switch controls the power-on device to power on the handheld apparatus. When the handheld apparatus is turned on, the acoustic sensor detects a sound from the handheld apparatus, and the pressure head of the power-on device is controlled and moved away.

In a preferred embodiment of the present invention, a power-on device for booting a handheld device by voice control comprises a time relay, and a time relay signal coupled between a solenoid valve and an acoustic sensor. If the trigger switch triggers the solenoid valve, and the acoustic sensor detects a sound produced by the solenoid valve, then the acoustic sensor will send a signal to the solenoid valve to control and move away the pressure head, so that the power-on device will be unable to complete the operation of booting the handheld apparatus, and the time relay will block a mis-trigger of the acoustic sensor caused by a sound of the solenoid valve. In general, the powered-on device will start a time relay, and the action time of the time relay is approximately equal to the action time of the solenoid valve. In a preferred embodiment of the present invention, the time relay blocks the signal generated by the acoustic sensor for 2 seconds. The sound intensity of the acoustic sensor of the present invention falls within a range from 70 decibels to 90 decibels.

The power-on device controlled by the solenoid valve comprises a pushing device and a pressure head, and persons ordinarily skilled in the art should understand that the power-on device includes a pushing device which can be a pneumatic cylinder, a hydraulic cylinder, or an electric motor. The solenoid valve controls the air pressure in a cylinder, and the air pressure drives and moves the pressure head of the power-on device. In general, the air pressure of pressing or rebouncing the pressure head of the power-on device is approximately equal to 0.1±0.02 MPa.

The present invention further provides a method for booting a handheld apparatus by voice control, and the method comprises the steps of: placing the handheld apparatus at a base and triggering a trigger switch disposed on the base; controlling a power-on device by the trigger switch to power on the handheld apparatus; and detecting a sound from the handheld apparatus by an acoustic sensor to control and move away the power-on device, after the handheld apparatus is turned on to produce the sound. After the trigger switch turns on the solenoid valve, the solenoid valve controls the power-on device to power on the handheld apparatus. The acoustic sensor detects a sound and the solenoid valve controls and moves away the pressure head of the power-on device.

In another preferred embodiment of the present invention, when the trigger switch turns on the solenoid valve to control the power-on device to power on the handheld apparatus, the solenoid valve starts a time relay to block a signal generated by the acoustic sensor after a mis-trigger of the acoustic sensor is caused by a sound of the solenoid valve, wherein the action time of the time relay is approximately equal to the action time of the solenoid valve, and the time relay for blocking the signal generated by the acoustic sensor is equal to 2 seconds in this preferred embodiment.

After the handheld apparatus is powered on, it is necessary to confirm that no defective production line as shown follows and appears in the boot screen. After the pressure head of the power-on device is acted to press on the closed button of the handheld apparatus for 7 to 8 seconds, the boot screen appears, and the booting procedure ends. If the pressure head is pressed continuously, the handheld apparatus will enter into another program, so that when the boot screen of the handheld apparatus appears and the speaker produces a sound, the boot sound triggers the acoustic sensor, and after the acoustic sensor detects the sound of the handheld apparatus, the solenoid valve controls and moves away the pressure head of the power-on device.

In addition, the device for booting a handheld apparatus by voice control can be used for inspecting a handheld apparatus that produces no sound. After the handheld apparatus is booted and the pressure head of the power-on device is not rebounded, it is determined that the speaker fails to produce sound, so that there must be a problem existed in the interface of the handheld apparatus and causing the speaker not to produce sound.

With the device for booting a handheld apparatus by voice control in accordance with the present invention, the pressure head of this device can be used for booting the handheld apparatus automatically. When a booting sound is produced, the acoustic sensor can detect the sound of the handheld apparatus, and the solenoid valve controls and moves away the pressure head of the power-on device. For an operation in a production line, it no longer requires pressing the button manually for a long time, so as to facilitate the operation and enhance the efficiency of the handheld apparatus.

BRIEF DESCRIPTION OF THE DRAWINGS

FIG. 2A is a front view of a handheld apparatus with a device for booting the handheld apparatus by voice control in accordance with the present invention;

FIG. 2C is a top view of a handheld apparatus with a device for booting the handheld apparatus by voice control in accordance with the present invention;

DETAILED DESCRIPTION OF THE PREFERRED EMBODIMENTS

The technical characteristics, contents, advantages and effects of the present invention will become apparent with the detailed description of preferred embodiments and the illustration of related drawings as follows. It is noteworthy to point out that same numerals are used for representing respective same elements throughout the drawings.

Figure 1:
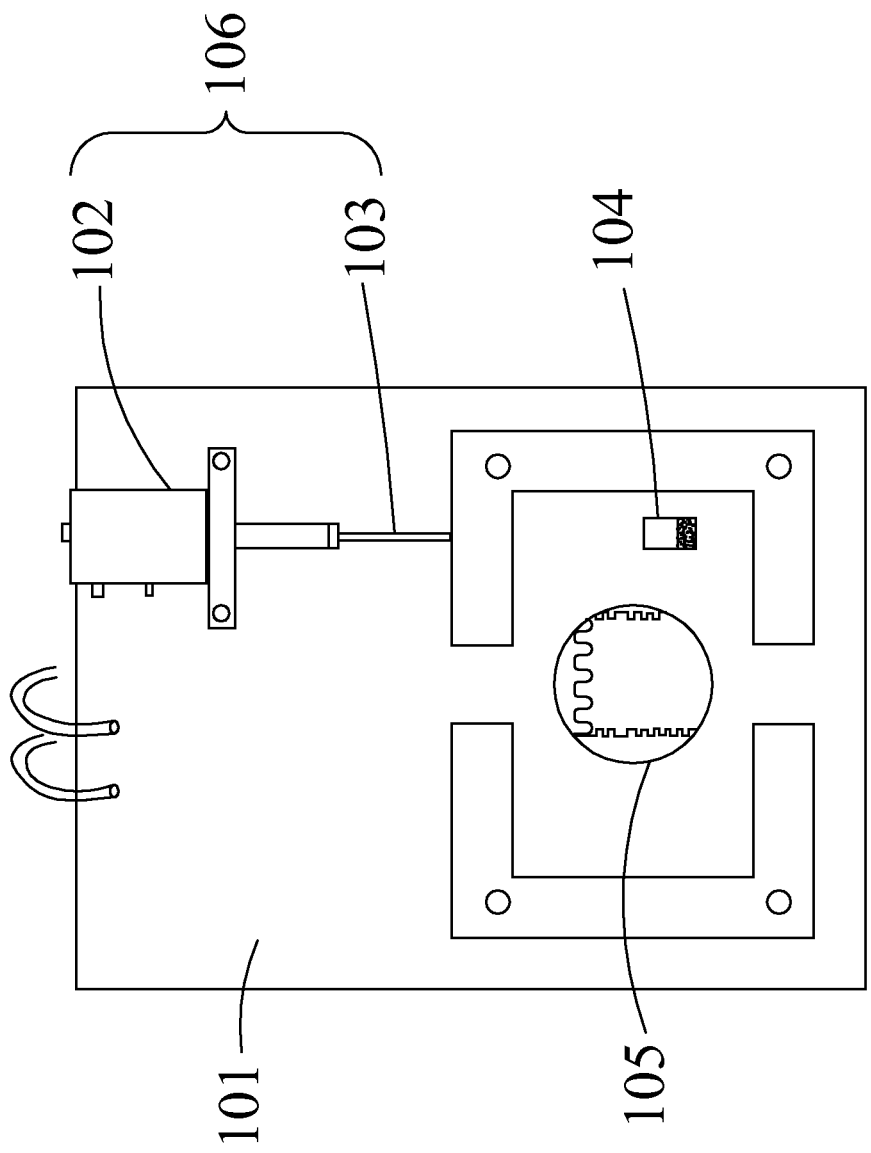
FIG. 1 is a schematic view of a device for booting a handheld apparatus by voice control in accordance with the present invention.

With reference to FIG. 1 for a schematic view of a device for booting a handheld apparatus by voice control in accordance with the present invention, this device comprises a base 101 having an opening formed in a surface of the base, a power-on device 106, a trigger switch 104 protruded from the surface of the base, and an acoustic sensor 105 disposed within the opening. The detectable sound intensity, i.e., voice intensity, by the acoustic sensor 105 in the present invention falls within a range from 70 decibels to 90 decibels. The power-on device 106 comprises a pushing device 102 and a pressure head 103. The pressure head 103 is pressed and rebounded with an air pressure approximately equal to 0.1±0.02 MPa. Persons ordinarily skilled in the art should understand that the pushing device 102 of the power-on device 106 can be a pneumatic cylinder, a hydraulic cylinder, or an electric motor. The pushing device 102 is a pneumatic cylinder in this preferred embodiment.

The device for booting a handheld apparatus by voice control of the present invention further comprises a solenoid valve (not shown in FIG. 1) and a time relay (not shown in FIG. 1).

Figure 2B:
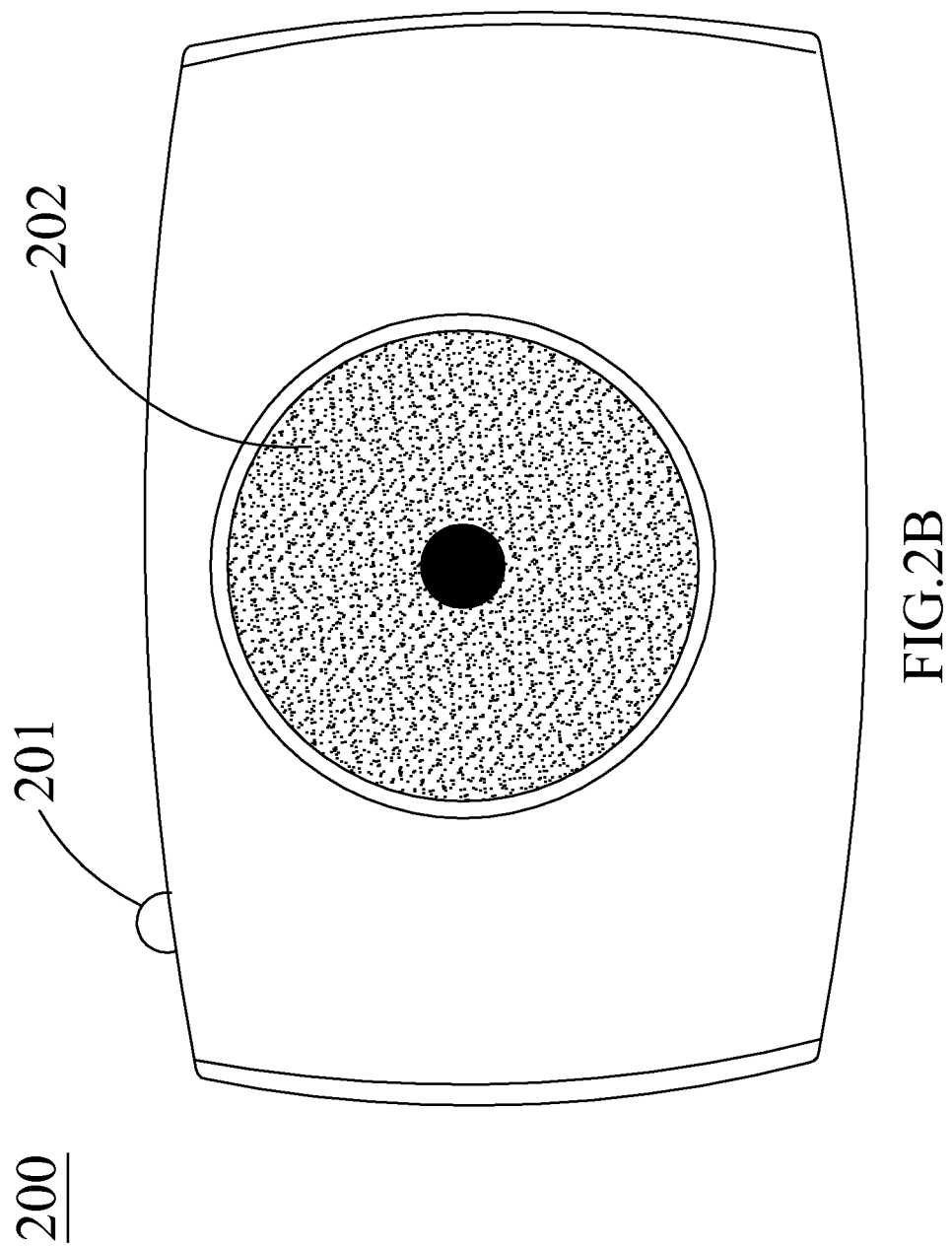
FIG. 2B is a back view of a handheld apparatus with a device for booting the handheld apparatus by voice control in accordance with the present invention.

With reference to FIGS. 2A, 2B, and 2C for a front view, a back view and a top view of a handheld apparatus with a device for booting the handheld apparatus by voice control in accordance with the present invention respectively, it takes approximately 7 to 8 seconds for a boot screen appears after the pressure head 103 (as shown in FIG. 1) is acted to press a power-on button 201 of the handheld apparatus 200, and a speaker 202 produces a sound, i.e., a voice, as soon as the boot screen appears after the pressure head 103 is acted to press the power-on key 201 of the handheld apparatus 200.

Preferably, users should confirm that no defective production line is shown on the boot screen after the handheld apparatus 200 is powered on.

Figure 3:
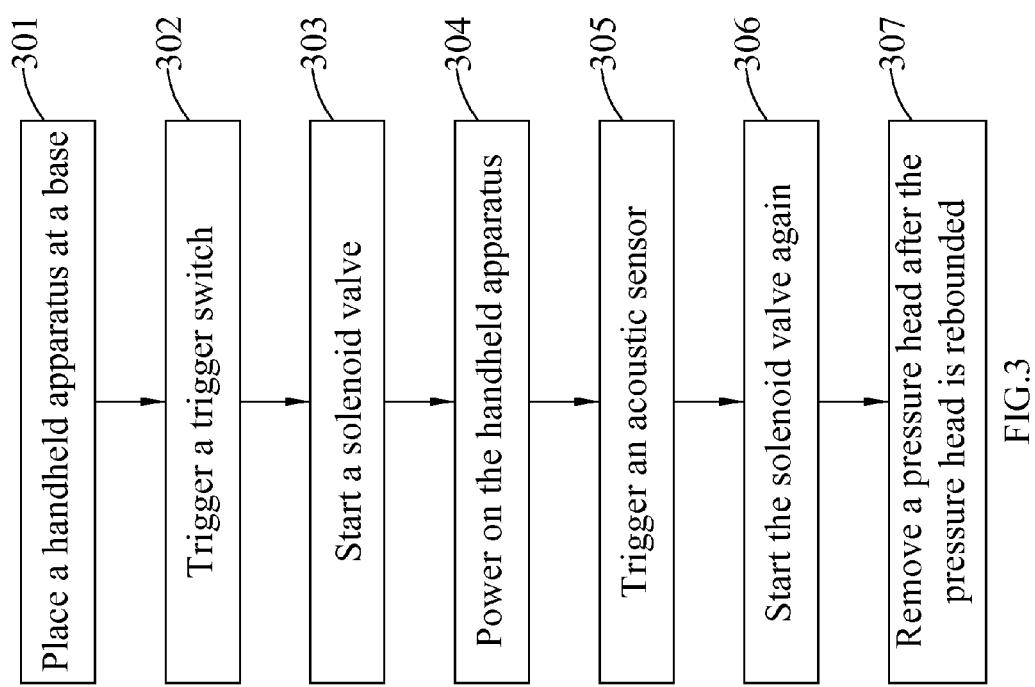
FIG. 3 is a flow chart for a method for booting a handheld apparatus by voice control in accordance with the present invention.

With reference to FIG. 3 for a flow chart of a method for booting a handheld apparatus 200 by voice control in accordance with the present invention, the method comprises the following steps.

Step 301: Place a handheld apparatus 200 at a base 101 of a device for booting the handheld apparatus by voice control.

Step 302: Trigger a trigger switch 104.

Step 303: Start a solenoid valve to control the operation of a pushing device 102 of a power-on device 106.

Step 304: Power on the handheld apparatus 200 by the power-on device 106.

Step 305: Trigger an acoustic sensor 105 by a booting sound.

Step 306: Start the solenoid valve again to control the operation of the pushing device 102 of the power-on device 106.

Step 307: Remove a pressure head 103 after the pressure head 103 is rebounded by an air pressure of the pushing device 102.

Preferably, a time relay signal is connected between the solenoid valve and the acoustic sensor 105, and the time relay blocks a mis-trigger of the acoustic sensor 105 caused by a sound of the solenoid valve. The time relay for blocking the signal produced by the acoustic sensor 105 is substantially equal to 2 seconds, and the solenoid valve starts the time relay.

Preferably, the pressure head 103 is acted to press a power-on button 201 of the handheld apparatus 200 for 7 to 8 consecutive seconds, such that the booting process ends when the boot screen appears. If the pressure head 103 is pressed continuously, then the handheld apparatus 200 will execute another program, and a speaker 202 will produce a sound when the boot screen of the handheld apparatus 200 appears, and the booting sound triggers the acoustic sensor 105. After the acoustic sensor 105 detects the sound of the handheld apparatus 200, the solenoid valve controls and moves away the pressure head 103 of the power-on device 106.

Preferably, the device for booting the handheld apparatus by voice control can be used for inspecting a handheld apparatus 200 that produces no sound. The speaker 202 is determined to be failed, and there must be a problem existed in the interface of the handheld apparatus 200 that causes no sound by the speaker 202, if the handheld apparatus 200 is booted and the pressure head 103 is not bounced.

Figure 4:
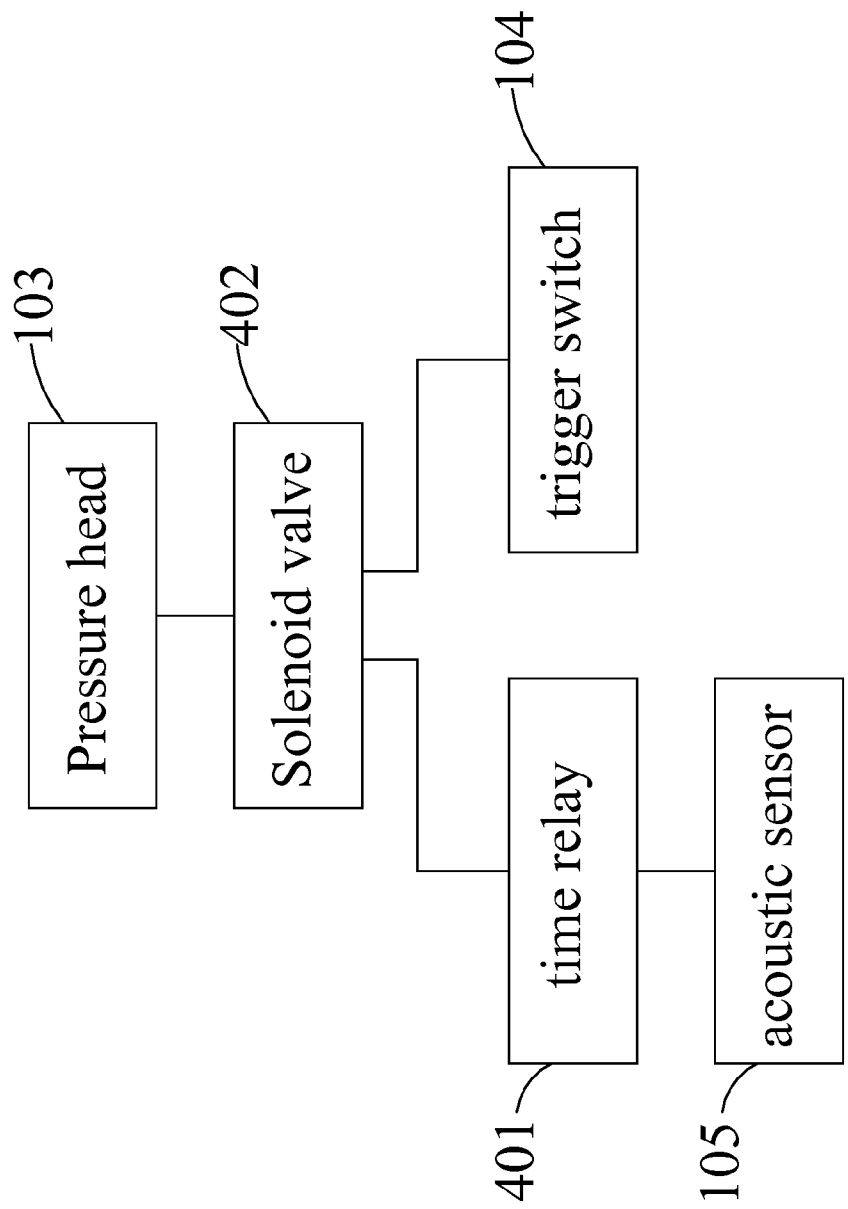
FIG. 4 is a block diagram showing the operating principle of circuits of a device for booting a handheld apparatus by voice control in accordance with the present invention.

With reference to FIG. 4 for a block diagram showing the operating principle of circuits of a device for booting a handheld apparatus by voice control in accordance with the present invention, the pressure head 103, the trigger switch 104, the acoustic sensor 105, the solenoid valve 402 and the time relay 401 are assembled to form a complete closed circuit provided for booting the handheld apparatus 200. When the handheld apparatus 200 is placed at a device for booting the handheld apparatus by voice control, the whole closed circuit starts its operation, and one of the operating circuits includes the following operations: Start the solenoid valve 402 after the trigger switch 104 works, and the solenoid valve 402 starts a time relay 401 to block a signal generated by the acoustic sensor 105 after a mis-trigger caused by the sound of the solenoid valve 402, and then the solenoid valve 402 controls an air pressure in the pushing device 102 to push the pressure head 103 of the power-on device 106 to move. Another operating circuit performs the following operations: After the handheld apparatus 200 produces a sound, and the acoustic sensor 105 detects the sound produced by the handheld apparatus 200, the acoustic sensor 105 sends out a signal to the solenoid valve 402, and the solenoid valve 402 controls and moves away the pressure head 103 of the power-on device 103.

In summation of the description above, the present invention can improve over the prior art and comply with the patent application requirements, and thus is duly filed for patent application.

While the invention has been described by device of specific embodiments, numerous modifications and variations could be made thereto by those generally skilled in the art without departing from the scope and spirit of the invention set forth in the claims.

What is claimed is:

1. A device for booting a handheld apparatus by sound detection, comprising:
   a base, having an opening formed on a surface of the base;
   a trigger switch, protruded from the surface of the base;
   an acoustic sensor, disposed within the opening; and
   a power-on device, including a pushing device and a pressure head;
   wherein when the handheld apparatus is placed at the base, the trigger switch is triggered to control the power-on device to power on the handheld apparatus;
   wherein when the handheld apparatus is turned on, the acoustic sensor detects a sound from the handheld apparatus, and the pressure head of the power-on device is controlled and moved away.

2. The device of claim 1, wherein the pushing device is a pneumatic cylinder, a hydraulic cylinder, or an electric motor.

3. The device of claim 2, further comprising a solenoid valve, which is a device coupled to the trigger switch electronically, and provided for controlling an operation of the pushing device.

4. The device of claim 3, wherein the power-on device is coupled to the solenoid valve electronically.

5. The device of claim 4, further comprising a time relay coupled electronically between the solenoid valve and the acoustic sensor, and the time relay being provided for blocking a mis-trigger of the acoustic sensor caused by a noise of the solenoid valve.

6. The device of claim 5, wherein the solenoid valve is provided for starting the time relay.

7. The device of claim 6, wherein the time relay blocks the mis-trigger of the acoustic sensor for substantially two seconds.

8. The device of claim 1, wherein the sound detected by the acoustic sensor is within a range from substantially 70 decibels to 90 decibels.

9. The device of claim 1, wherein the pressure head of the power-on device is pressed and rebounded with an air pressure substantially equal to $0.1 \pm 0.02$ MPa.

10. A method for booting a handheld apparatus by sound detection, comprising the steps of:
    placing the handheld apparatus at a base and triggering a trigger switch disposed on the base;
    controlling a power-on device by the trigger switch to power on the handheld apparatus; and
    detecting a sound from the handheld apparatus by an acoustic sensor to control the power-on device to move away, after the handheld apparatus is turned-on to produce the sound.

11. The method of claim 10, wherein the trigger switch turns on a solenoid valve, and the solenoid valve controls a power-on device to power on the handheld apparatus.

12. The method of claim 10, wherein when the acoustic sensor detects the sound, the solenoid valve controls and moves away a pressure head of the power-on device.

13. The method of claim 10, wherein when the trigger switch turns on the solenoid valve to control the power-on device to power on the handheld apparatus, the solenoid valve starts a time relay to block a mis-trigger of the acoustic sensor caused by a noise of the solenoid valve.

14. The method of claim 13, wherein the time relay blocks the mis-trigger of the acoustic sensor for substantially two seconds.

15. The method of claim 10, wherein the solenoid valve controls a pneumatic cylinder of the power-on device to push a pressure head of the power-on device by an air pressure.

* * * * *